United States Patent [19]

Madison

[11] Patent Number: 4,940,276
[45] Date of Patent: Jul. 10, 1990

[54] CAR COVER

[76] Inventor: Donald Madison, 1275 Weybridge Rd., Columbus, Ohio 43220

[21] Appl. No.: 299,616

[22] Filed: Jan. 11, 1989

[51] Int. Cl.⁵ .............................................. B60J 11/00
[52] U.S. Cl. .................................. 296/136; 296/95.1; 160/370.2
[58] Field of Search ............... 296/95.1, 136; 150/521; 160/370.2

[56] References Cited

U.S. PATENT DOCUMENTS

| | | | |
|---|---|---|---|
| 2,243,981 | 6/1941 | Rowan | 296/136 |
| 4,355,839 | 10/1982 | Rosen | 296/136 |
| 4,842,324 | 4/1989 | Carden | 296/95.1 |

Primary Examiner—Robert R. Song
Attorney, Agent, or Firm—Charles S. Knothe

[57] ABSTRACT

A theft resistance car cover to shield the roof and windows from sun, ice and snow comprising a cover having a size corresponding to vehicle outer surface. Rear notch lock straps with one end free and the other end attached to the cover, attach the rear of the cover to the joint between the trunk lid and the vehicle body. These straps contain semi-rigid cores located perpendicularly within the straps so cores cannot pass through the joint.

Front wedge notch straps with one end free and the other end attached to the front corners of the cover attach the cover to the joint between the doors and the vehicle body. These straps contain semi-rigid wedge shaped cores located perpendicularly within the straps so that front wedge lock straps can be secured in the joint and not allow the straps to slip within the joint.

The cover contains slits in the perpendicular direction from the side window edge of the cover so that the doors can be opened. These slits have zippers to fasten them.

3 Claims, 4 Drawing Sheets

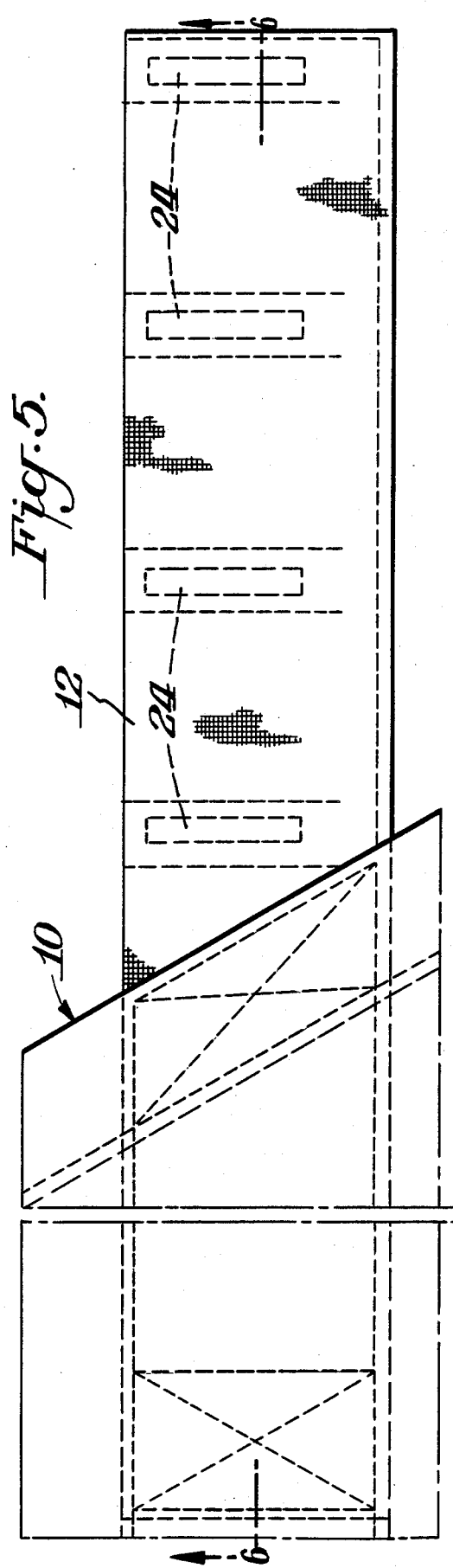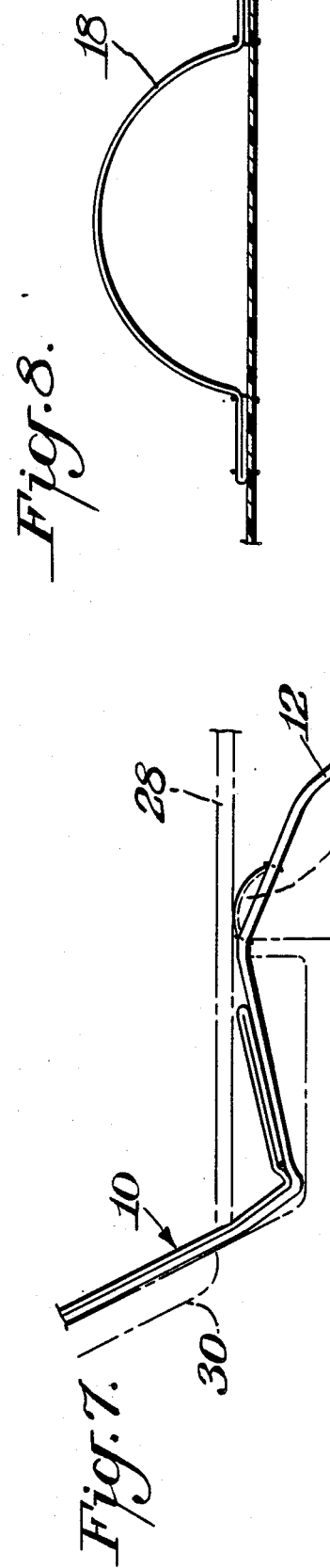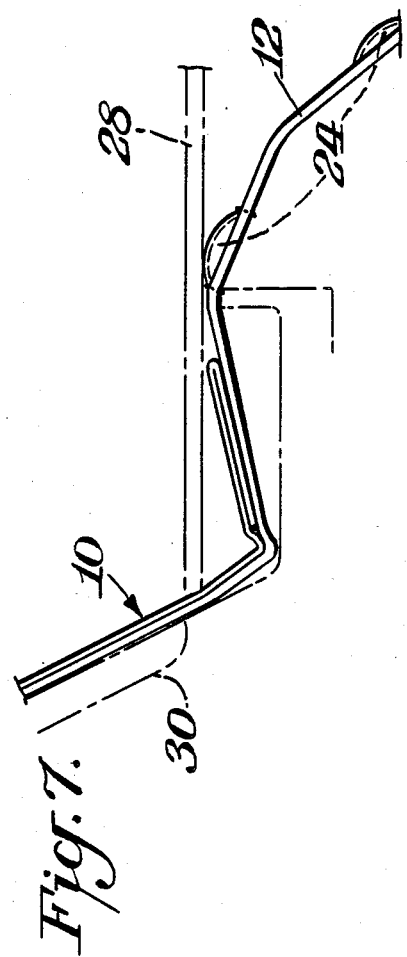

CAR COVER

BACKGROUND OF THE INVENTION

When many vehicle owners park outside they want to protect their vehicle windows from the sun, ice and snow. In summer covering the windows can reduce interior temperature by many degrees and reduce the discomfort of a hot interior and the deterioration caused by the heat. In winter covering the windshield, rear window and side windows makes the removing of ice and snow much quicker than the alternative of brushing, melting, and scraping.

Vehicle covers are available to protect the vehicle exterior from these elements. Generally these covers are fabricated from soft, pliable, weather proof fabrics. Because of the size and the amount of fabric necessary to cover the vehicle they are expensive. Unfortunately they are frequently stolen. To reduce the potential theft many locking means have been devised. Some of these locking devices use metal fasteners which can damage the vehicle finish.

Other theft deterrent devices use straps which contain enlargements which are inserted in the joints between the door and the body. These devices allow the straps to slip within the joint and therefore do not hold the cover in the proper place.

SUMMARY OF THE INVENTION

This invention relates to a simple vehicle cover to protect a vehicle against sun, ice and snow with effective theft deterrent attaching devices to keep the cover in the proper location.

Another object of this invention is to allow entry and exit from the vehicle once the cover is installed without removing it. This allows entry to retrieve an item, to start the vehicle or to use the cover as a night screen for travelers who rest in the vehicle.

More particularly this invention relates to a theft resistance car cover to shield the roof, windshield, rear window and side windows from the sun, ice and snow, comprised of a cover having a size corresponding to the outer surface of the vehicle roof, windshield, back window and side windows with an outer and inner surface. Flexible rear notch lock straps are used to attach the rear of the cover to the vehicle. These rear notch lock straps have one end free and the other end attached to the cover at the rear such that the rear notch straps can be secured in the joint between the trunk lid and the vehicle body. These rear notch straps contain semi-rigid cores located perpendicular within the rear notch lock straps such that the semi-rigid cores cannot pass through the joint between the trunk lid and the vehicle body.

Flexible front wedge notch straps are used to attach the front of the cover to the vehicle. These front wedge notch straps have one end free and the other end attached to the cover located at the front corners such that the front wedge notch straps can be secured in the joint between the door and the vehicle body. The front wedge notch straps have semi-rigid wedge shaped cores located perpendicularly within the front wedge lock straps such that the front wedge lock straps can be secured in the joint between the door and the vehicle body and not allow the straps to slip.

The cover contains slits in the perpendicular direction from the side window edge of the cover located at the vehicle doors so that the doors can be opened. These slits can be fastened with a zipper. The cover has a handle attached on the top surface of the cover for carrying.

BRIEF DESCRIPTION OF THE INVENTION

The present invention is illustrated in detail according with the accompanying drawings, as follows: FIG. 1 is a top view of the car cover laid flat.

FIG. 5 is a fragmentary top view of the rear notch lock strap.

FIG. 6 is a cross-sectional view of the fragmentary top view of the rear notch lock strap indicated by line 6—6 of FIG. 5.

FIG. 7 is a fragmentary sectional view of the rear notch lock strap entered in the joint between the truck lid and the vehicle body.

FIG. 8 is a cross-sectional view of handle indicated by line 8—8 of FIG. 1.

DETAILED DESCRIPTION OF THE PREFERRED EMBODIMENT IN THE DRAWINGS

Figure 1:
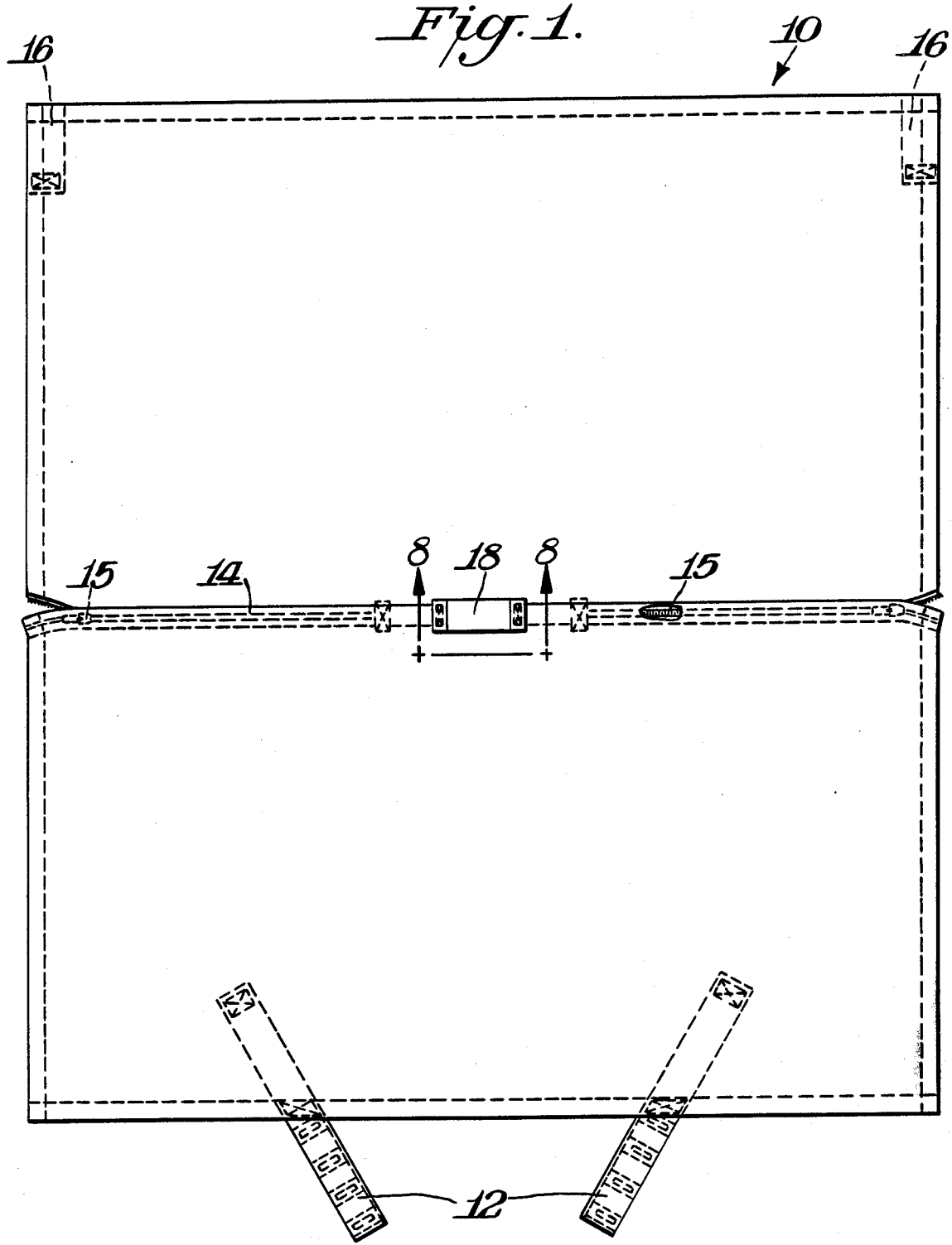

FIG. 1 shows the cover 10 laid flat. The cover is fabricated from a soft, pliable, weather proof fabric. In the preferred embodiment the fabric is a two ply material with the outer ply having a reflective aluminum coating and the inter ply being a soft fabric material. The outer ply reflects the heat from the sun keeping the vehicle cooler in the Summer and the inner ply protecting the vehicle's finish from scratches. The zippers 15 fastens the front and rear segments of the cover together along the center seam 14. The opening created by zipper 15 allows the driver to enter the vehicle while the cover is installed without removing it. Thus the driver can start the vehicle prior to the removal of the cover. Even though the zippers are covered by fabric lips the use of non-metal zippers is preferred to reduce the possibility of scratching the finish of the vehicle. Also, other fastening devices such as "Velcro" can be used. The handle 18 is attached in the middle of the cover 10 between the two zippers 15. The handle helps the driver install and remove the cover from the vehicle. The front wedge lock straps 16 are attached to the cover 10 on the inside at the two front corners of the cover. The rear lock straps 12 are attached to the cover 10 along the rear edge of the cover and are inserted in the seam between the truck lid and the vehicle body.

Figure 2:
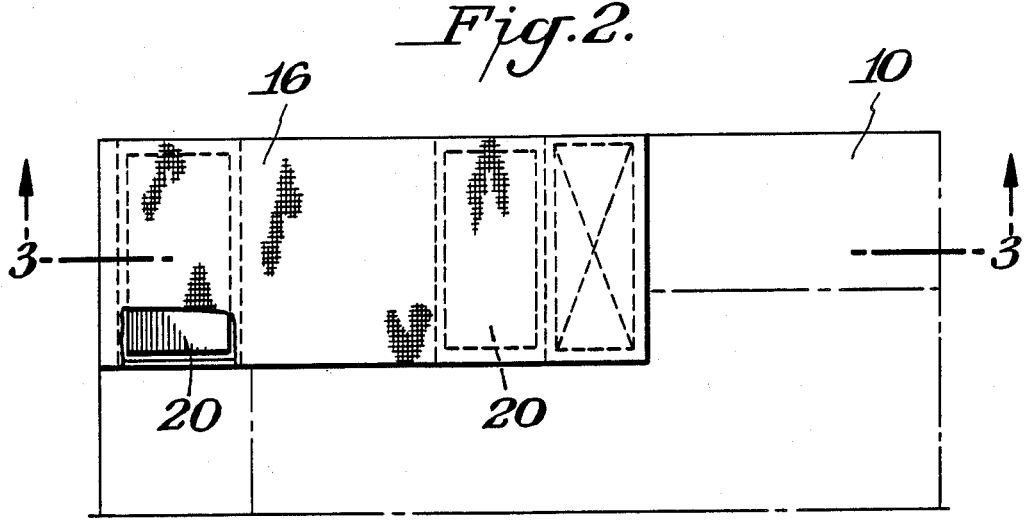
FIG. 2 is a fragmentary view of the front wedge notch strap.

FIG. 2 shows the front wedge strap 16 which is constructed of fabric and contains pockets created by folding the fabric and attached to cover 10. The semi-rigid wedge shaped cores 20 are inserted in the pockets. When tension is applied to the front wedge strap the cores lock in the joint between the door and the fender and securely hold the cover in place.

Figure 3:
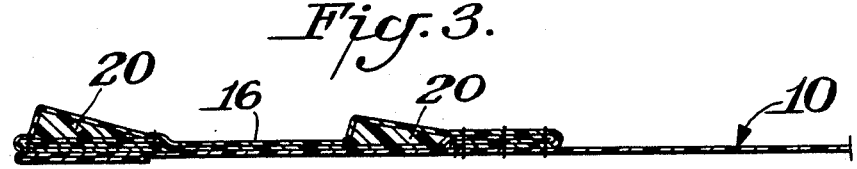
FIG. 3 is a sectional view of the front wedge notch strap taken in the plane indicated by line 3—3 of FIG. 2.

FIG. 3 shows the semi-rigid cores 20 located in the pockets created in the front wedge lock strap 16 by the folds and sewing of the strap. Further, this figure shows the cross-sectional shape of the wedge core 20 contained in the strap 16.

Figure 4:
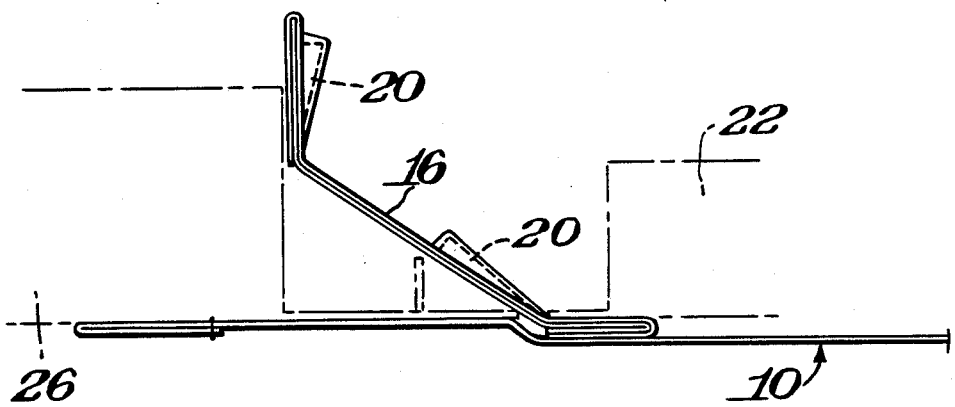
FIG. 4 is a fragmentary sectional view of the front wedge notch inserted in the joint between the door and the vehicle body.

FIG. 4 depicts the front wedge lock strap 16 with the wedge core locked into the joint between the door 22 and fender 26 of the vehicle. The strap 16 is secured to the cover 10 by stitching in the customary manner.

The rear notch lock strap is shown in FIG. 5. The straps 12 constructed of two plies of fabric are attached to the cover 10 by conventional sewing techniques. The semi-rigid cores 24 are sewn into pockets created in the strap 12. Several cores are placed in the strap at regular intervals to allow for using the straps on varying sized vehicles.

The cross sectional shape of the rear notch lock strap is shown in FIG. 6. This figure also shows the two ply construction of the strap and the pockets created to hold the semi-circular cores 24. The strap 12 is sewn at one end to the cover 10.

In FIG. 7 the rear lock strap 12 is inserted between the truck lid 28 and the rear panel 30 of the vehicle. The strap can only slip as far as the cores 24 allow. The extra cores 24 either are outside the joint or contained in the trunk.

The handle 18 as shown in FIG. 8, the handle is sewn to the cover 10 such that sufficient room is available to properly grasp the handle with a hand.

Figure 9:
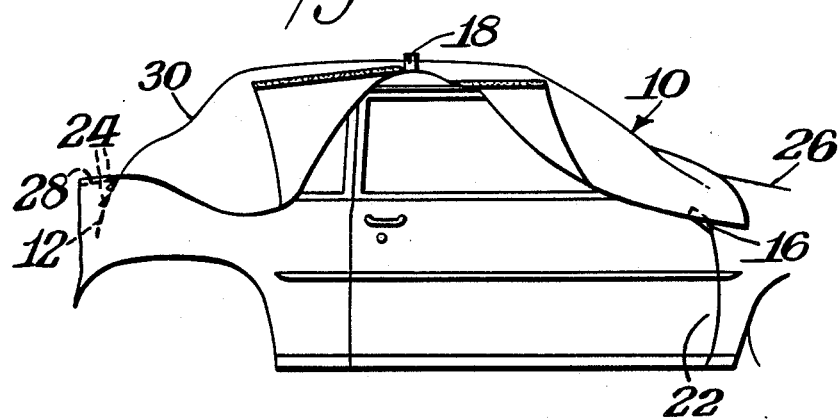
FIG. 9 is a perspective view of the car cover installed on a vehicle with the slits open to allow entry into the vehicle.
Figure 10:
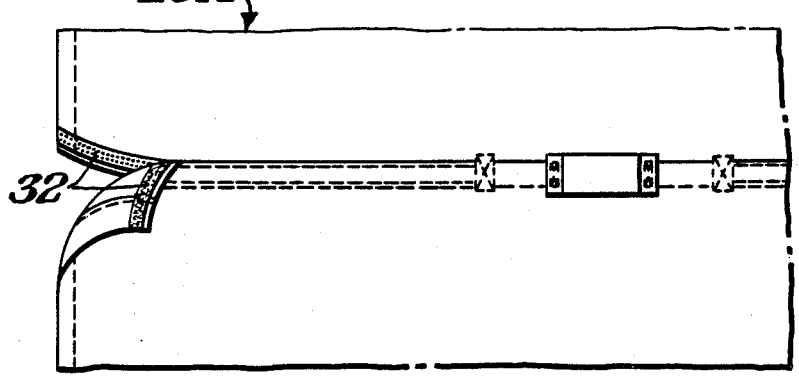
FIG. 10 is a fragmentary view of the closing device using "Velco" as the closing device.

.FIG. 9 shows the cover 10 installed on a vehicle. The front wedge lock straps 16 are inserted between the door 22 and the fender 26. Because of the wedge shaped cross section of cores contain in these straps the strap does not ride up in the seam. The cover as shown in this drawing is open with the zipper 15 parted allowing entry into the vehicle. The handle 18 is located on the top of the vehicle allowing positioning of the cover on the vehicle and for easy removal. The rear lock straps 12 are inserted between the truck lid 28 and the rear panel 30 of the vehicle with the semi-circular cores 24 stopping the lock strap from slipping out of the joint the lid and body.

I claim:

1. A theft resistance car cover to shield the roof, windshield, rear window and side windows from the sun, ice and snow comprising:

a cover having a size corresponding to the outer surface of the vehicle roof, windshield, back window and side windows having an outer and inner surface;

a plurality of flexible rear notch lock straps with one end free and the other end attached to the cover at the rear of the cover such that the rear notch straps can be secured in the joint between the trunk lid and the vehicle body;

a plurality of semi-rigid cores located perpendicularly within the rear notch lock straps such that the semi-rigid cores cannot pass through the joint between the trunk lid and the vehicle body;

a plurality of flexible front wedge notch straps with one end free and the other end attached to the cover located at the front corners of the cover such that the front wedge notch straps can be secured in the joint between the door and the vehicle body;

a plurality of semi-rigid wedge shaped cores located perpendicularly within the front wedge lock straps such that the front wedge lock straps can be secured in the joint between the door and the vehicle body and not allow the straps to slip within said joint;

a plurality of slits in the perpendicular direction from the side window edge of the cover located at the vehicle doors so that the doors can be opened;

a means to fasten the slits;

a handle attached to the cove on the top surface of the cover.

2. The same device as claimed in claim 1 wherein the means to fasten the slits is a non-metal zipper.

3. The same device as claimed in claim 1 wherein the means to fasten the silts is a hook and loop tape faster system.

* * * * *